US011014176B2

(12) United States Patent
Jensen et al.

(10) Patent No.: US 11,014,176 B2
(45) Date of Patent: May 25, 2021

(54) JIGSAW

(71) Applicant: MILWAUKEE ELECTRIC TOOL CORPORATION, Brookfield, WI (US)

(72) Inventors: Robert P. Jensen, Thiensville, WI (US); Andrew R. Wyler, Pewaukee, WI (US); Daniel Reif, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 18 days.

(21) Appl. No.: 16/361,440

(22) Filed: Mar. 22, 2019

(65) Prior Publication Data

US 2019/0299307 A1 Oct. 3, 2019

Related U.S. Application Data

(60) Provisional application No. 62/651,776, filed on Apr. 3, 2018.

(51) Int. Cl.
*B23D 49/16* (2006.01)
*B23D 59/00* (2006.01)

(52) U.S. Cl.
CPC ......... *B23D 49/162* (2013.01); *B23D 59/001* (2013.01)

(58) Field of Classification Search
CPC ........ B23D 49/162; B23D 59/001; B25F 5/02
See application file for complete search history.

(56) References Cited

U.S. PATENT DOCUMENTS 2,306,769 A 12/1942 Wilhide
2,320,113 A 5/1943 Wilhide
2,352,013 A * 6/1944 Roth ................. B26B 29/02
30/295

(Continued)

FOREIGN PATENT DOCUMENTS

CN 2295295 Y 10/1998
CN 2369805 Y 3/2000
(Continued)

OTHER PUBLICATIONS

International Search Report and Written Opinion for Application No. PCT/US2019/018701, dated May 29, 2019, 12 pages.

(Continued)

*Primary Examiner* — Hwei-Siu C Payer
(74) *Attorney, Agent, or Firm* — Michael Best & Friedrich LLP (57) ABSTRACT

A power tool includes a housing having a base configured to support the power tool relative to a workpiece. The power tool includes a handle coupled to the housing. The handle defines a longitudinal axis and includes a first portion positioned between the longitudinal axis. The housing the base and a second portion opposite the first portion and extending away from the base. The power tool includes an activation switch coupled to a side surface of the housing. The activation switch is slidable in a direction parallel with a switch axis that intersects the longitudinal axis from a deactivated state, in which the drive system is non-operable, to an activated state, in which the drive system is operable. The activation switch is slidable toward the second portion of the housing from an intersection point between the switch axis and the longitudinal axis.

20 Claims, 4 Drawing Sheets

(56) References Cited

U.S. PATENT DOCUMENTS

| | | |
|---|---|---|
| 2,781,800 A | 2/1957 | Papworth |
| 2,931,402 A | 4/1960 | Papworth |
| 2,949,944 A | 8/1960 | Blachly |
| 2,980,218 A | 4/1961 | Young |
| 3,121,813 A | 2/1964 | Pratt et al. |
| 3,225,232 A | 12/1965 | Turley et al. |
| 3,309,484 A | 3/1967 | Frenzel |
| 3,328,613 A | 6/1967 | Gawron |
| 3,388,728 A | 6/1968 | Riley, Jr. et al. |
| 3,491,259 A | 1/1970 | Damijonaitis et al. |
| 3,536,943 A | 10/1970 | Bowen III, et al. |
| 3,611,095 A | 10/1971 | Schnizler |
| 3,695,344 A | 10/1972 | Schnizler, Jr. |
| 3,739,659 A | 6/1973 | Workman, Jr. |
| 3,842,328 A | 10/1974 | Supel et al. |
| 3,965,778 A | 6/1976 | Aspers et al. |
| 4,002,959 A | 1/1977 | Schadlich et al. |
| 4,118,615 A | 10/1978 | Leibundgut |
| 4,129,240 A | 12/1978 | Geist |
| 4,157,491 A | 6/1979 | Werner et al. |
| 4,238,884 A | 12/1980 | Walton, II |
| 4,240,204 A | 12/1980 | Walton, II et al. |
| 4,262,421 A | 4/1981 | Bergler et al. |
| 4,298,072 A | 11/1981 | Baker et al. |
| 4,307,325 A | 12/1981 | Saar |
| 4,342,929 A | 8/1982 | Home |
| 4,348,603 A | 9/1982 | Huber |
| 4,410,846 A | 10/1983 | Gerber et al. |
| 4,412,158 A | 10/1983 | Jefferson et al. |
| 4,418,562 A | 12/1983 | Sakai et al. |
| 4,490,771 A | 12/1984 | Huber et al. |
| 4,503,370 A | 3/1985 | Cuneo |
| 4,504,769 A | 3/1985 | Fushiya et al. |
| 4,516,324 A | 5/1985 | Heininger, Jr. et al. |
| 4,543,723 A | 10/1985 | Bortfield et al. |
| 4,548,248 A * | 10/1985 | Riemann ............... B25G 1/102 30/308 |
| 4,574,226 A | 3/1986 | Binder |
| 4,628,459 A | 12/1986 | Shinohara et al. |
| 4,628,605 A | 12/1986 | Clowers |
| 4,689,534 A | 8/1987 | Gerber et al. |
| 4,725,764 A | 2/1988 | Prestel |
| 4,881,435 A | 11/1989 | Hansson |
| 4,940,177 A | 7/1990 | Jimena |
| 4,964,558 A | 10/1990 | Crutcher et al. |
| 5,007,776 A | 4/1991 | Shoji |
| 5,017,109 A | 5/1991 | Albert et al. |
| 5,105,130 A | 4/1992 | Barker et al. |
| 5,115,175 A | 5/1992 | Fletcher |
| 5,120,983 A | 6/1992 | Samann |
| 5,146,682 A | 9/1992 | Blochle et al. |
| 5,154,242 A | 10/1992 | Soshin et al. |
| 5,196,747 A | 3/1993 | Kress et al. |
| 5,203,242 A | 4/1993 | Hansson |
| 5,268,622 A | 12/1993 | Philipp |
| 5,440,215 A | 8/1995 | Gilmore |
| 5,443,196 A | 8/1995 | Burlington |
| 5,443,276 A | 8/1995 | Nasser et al. |
| 5,526,460 A | 6/1996 | DeFrancesco et al. |
| 5,558,476 A | 9/1996 | Uchida et al. |
| 5,596,810 A | 1/1997 | Neubert et al. |
| 5,605,268 A | 2/1997 | Hayashi et al. |
| 5,644,846 A | 7/1997 | Durr et al. |
| 5,732,870 A | 3/1998 | Moorman et al. |
| 5,738,177 A | 4/1998 | Schell et al. |
| 5,747,953 A | 5/1998 | Philipp |
| 5,798,584 A | 8/1998 | Schaeffeler et al. |
| 5,798,589 A | 8/1998 | Ohi et al. |
| 5,923,145 A | 7/1999 | Reichard et al. |
| 5,931,072 A | 8/1999 | Shibata |
| 5,933,969 A | 8/1999 | Houben et al. |
| 5,946,810 A | 9/1999 | Hoelderlin et al. |
| 6,025,683 A | 2/2000 | Philipp |
| 6,047,477 A | 4/2000 | Di Nicolantonio |
| D426,124 S | 6/2000 | Kassalen et al. |
| 6,121,700 A | 9/2000 | Yamaguchi et al. |
| 6,155,246 A | 12/2000 | Yamami et al. |
| 6,241,027 B1 | 6/2001 | Beck et al. |
| 6,308,425 B1 | 10/2001 | Schumann |
| 6,320,286 B1 | 11/2001 | Ramarathnam |
| 6,353,705 B1 | 3/2002 | Capps et al. |
| 6,491,114 B1 | 12/2002 | Webel |
| 6,508,313 B1 | 1/2003 | Carney et al. |
| 6,518,719 B1 | 2/2003 | Suzuki et al. |
| 6,522,041 B1 | 2/2003 | Verbrugge et al. |
| 6,536,536 B1 | 3/2003 | Gass et al. |
| 6,538,403 B2 | 3/2003 | Gorti et al. |
| 6,568,089 B1 | 5/2003 | Popik et al. |
| D475,264 S | 6/2003 | Kondo et al. |
| 6,606,779 B2 | 8/2003 | Verbrugge et al. |
| 6,612,039 B2 | 9/2003 | Kakiuchi et al. |
| D468,983 S | 10/2003 | Kondo et al. |
| 6,669,072 B2 | 12/2003 | Burke et al. |
| 6,750,579 B2 | 6/2004 | Verbrugge et al. |
| 6,755,336 B2 | 6/2004 | Harper et al. |
| 6,771,043 B2 | 8/2004 | Matsunaga et al. |
| 6,796,475 B2 | 9/2004 | Adams |
| 6,810,589 B2 | 11/2004 | Lagaly et al. |
| 6,848,985 B2 | 2/2005 | Lamprecht et al. |
| 6,873,124 B2 | 3/2005 | Kawano et al. |
| 6,882,127 B2 | 4/2005 | Konigbauer |
| 6,892,459 B2 | 5/2005 | Okumara et al. |
| 6,945,337 B2 | 9/2005 | Kawai et al. |
| 6,974,061 B2 | 12/2005 | Adams et al. |
| 6,975,050 B2 | 12/2005 | Cleanthous et al. |
| 6,978,846 B2 | 12/2005 | Kawai et al. |
| 7,018,142 B2 | 3/2006 | Cooper |
| 7,047,651 B2 | 5/2006 | Delfini et al. |
| D522,829 S | 6/2006 | Andriolo |
| 7,058,291 B2 | 6/2006 | Weaver et al. |
| D524,620 S | 7/2006 | Netzler |
| 7,082,867 B2 | 8/2006 | Liao |
| D527,598 S | 9/2006 | Netzler |
| 7,101,274 B1 | 9/2006 | Etter et al. |
| 7,103,979 B2 | 9/2006 | Yoshida et al. |
| 7,109,675 B2 | 9/2006 | Matsunaga et al. |
| 7,112,934 B2 | 9/2006 | Gilmore |
| D530,173 S | 10/2006 | Waldron |
| 7,219,435 B2 | 5/2007 | Yoshida et al. |
| 7,246,533 B2 | 7/2007 | Lagaly et al. |
| 7,254,892 B2 | 8/2007 | Walker |
| 7,314,097 B2 | 1/2008 | Jenner et al. |
| 7,350,302 B2 | 4/2008 | Imai et al. |
| 7,372,226 B2 | 5/2008 | Wiker et al. |
| 7,419,013 B2 | 9/2008 | Sainomoto et al. |
| 7,428,934 B2 | 9/2008 | Arimura |
| 7,513,047 B2 | 4/2009 | Wu |
| 7,516,553 B2 | 4/2009 | Yoshida et al. |
| 7,518,837 B2 | 4/2009 | Tseng et al. |
| 7,526,867 B2 | 5/2009 | Park |
| 7,538,503 B2 | 5/2009 | Machens et al. |
| 7,552,749 B2 | 6/2009 | Kageler et al. |
| 7,554,290 B2 | 6/2009 | Johnson et al. |
| 7,596,873 B2 | 10/2009 | Di Nicolantonio |
| 7,628,102 B2 | 12/2009 | Kamiya et al. |
| 7,748,125 B2 | 7/2010 | Rakaczki |
| 7,771,253 B2 | 8/2010 | Wuensch |
| 7,784,388 B2 | 8/2010 | Chen |
| 7,818,887 B2 | 10/2010 | Saegesser et al. |
| 7,823,458 B2 | 11/2010 | Kibblewhite et al. |
| 7,882,899 B2 | 2/2011 | Borinato et al. |
| 7,882,900 B2 | 2/2011 | Borinato et al. |
| 7,893,586 B2 | 2/2011 | West et al. |
| 7,908,736 B2 | 3/2011 | Smith et al. |
| 8,022,654 B2 | 9/2011 | Zhao et al. |
| 8,046,926 B2 | 11/2011 | Bigden et al. |
| RE43,041 E | 12/2011 | Adams et al. |
| 8,074,731 B2 | 12/2011 | Iwata et al. |
| 8,082,825 B2 | 12/2011 | Butler |
| 8,141,444 B2 | 3/2012 | Lagaly et al. |
| 8,171,616 B2 | 5/2012 | Smith et al. |
| 8,176,069 B2 | 5/2012 | Matsunaga et al. |
| 8,179,069 B2 | 5/2012 | Matsunaga et al. |
| 8,272,135 B2 | 9/2012 | Zhou |

(56) References Cited

U.S. PATENT DOCUMENTS

| | | |
|---|---|---|
| 8,281,874 B2 | 10/2012 | Imada et al. |
| 8,291,603 B2 | 10/2012 | Saegesser et al. |
| 8,324,845 B2 | 12/2012 | Suzuki et al. |
| 8,336,432 B1 | 12/2012 | Butler |
| 8,360,166 B2 | 1/2013 | Iimura et al. |
| 8,461,785 B2 | 6/2013 | Sidhu |
| 8,564,236 B2 | 10/2013 | Hirabayashi et al. |
| 8,587,230 B2 | 11/2013 | Pant et al. |
| 8,587,231 B2 | 11/2013 | Pant |
| 8,627,900 B2 | 1/2014 | Oomori et al. |
| 8,653,764 B2 | 2/2014 | Oberheim |
| 8,656,598 B2 | 2/2014 | Kaiser et al. |
| 8,678,106 B2 | 3/2014 | Matsunaga et al. |
| 8,698,430 B2 | 4/2014 | Watanabe et al. |
| 8,713,806 B2 | 5/2014 | Tokunaga et al. |
| 8,732,962 B2 | 5/2014 | Laett |
| 8,752,644 B2 | 6/2014 | Weusthof |
| 8,757,287 B2 | 6/2014 | Mak et al. |
| 8,763,258 B2 | 7/2014 | Miller et al. |
| 8,813,373 B2 | 8/2014 | Scott |
| 8,826,548 B2 | 9/2014 | Kaiser et al. |
| 8,881,842 B2 | 11/2014 | Borinato et al. |
| 8,931,576 B2 | 1/2015 | Iwata |
| 9,044,851 B2 | 6/2015 | Tully |
| 9,085,087 B2 | 7/2015 | Ni et al. |
| 9,114,519 B2 | 8/2015 | Iwata et al. |
| 9,138,885 B2 | 9/2015 | Tully |
| 9,154,009 B2 | 10/2015 | Alemu |
| 9,186,735 B2 | 11/2015 | da Graca |
| 9,257,925 B2 | 2/2016 | Coates |
| 9,314,855 B2 | 4/2016 | Ookubo et al. |
| 9,314,900 B2 | 4/2016 | Vanko et al. |
| 9,318,932 B2 | 4/2016 | Purohit et al. |
| 9,321,112 B2 | 4/2016 | Vantran et al. |
| 9,406,915 B2 | 8/2016 | White et al. |
| 9,444,307 B2 | 9/2016 | Watanabe et al. |
| 9,450,472 B2 | 9/2016 | Hatfield et al. |
| 9,543,871 B2 | 1/2017 | Kato |
| 9,554,807 B2 | 1/2017 | McGinley et al. |
| 9,583,745 B2 | 2/2017 | White et al. |
| 9,583,793 B2 | 2/2017 | White et al. |
| 9,604,355 B2 | 3/2017 | Tully |
| 9,762,153 B2 | 9/2017 | Forster et al. |
| 9,827,623 B2 | 11/2017 | Gibbons et al. |
| 9,833,891 B2 | 12/2017 | Patterson |
| 9,866,153 B2 | 1/2018 | Kusakawa |
| 9,871,484 B2 | 1/2018 | White et al. |
| 9,889,548 B2 | 2/2018 | Sattler |
| 9,893,384 B2 | 2/2018 | Velderman et al. |
| D887,806 S * | 6/2020 | Jensen .................... D8/64 |
| 2002/0057147 A1 | 5/2002 | Shinoura et al. |
| 2002/0185514 A1 | 12/2002 | Adams et al. |
| 2003/0015979 A1 | 1/2003 | Karwath |
| 2003/0110918 A1 | 6/2003 | Baxivanelis et al. |
| 2003/0121677 A1 | 7/2003 | Watanabe et al. |
| 2003/0190877 A1 | 10/2003 | Gallagher et al. |
| 2004/0113583 A1 | 6/2004 | Konigbauer |
| 2004/0117993 A1 | 6/2004 | Armstrong |
| 2004/0197159 A1 | 10/2004 | Ishida et al. |
| 2004/0200628 A1 | 10/2004 | Schmitzer et al. |
| 2005/0058890 A1 | 3/2005 | Brazell et al. |
| 2005/0061523 A1 | 3/2005 | Bader et al. |
| 2005/0132582 A1 | 6/2005 | Gudmundson |
| 2006/0096103 A1 | 5/2006 | Roberts |
| 2006/0168824 A1 | 8/2006 | Lagaly et al. |
| 2006/0255166 A1 | 11/2006 | Imamura et al. |
| 2006/0288594 A1 | 12/2006 | Delfini et al. |
| 2007/0101586 A1 | 5/2007 | Felder et al. |
| 2007/0247095 A1 | 10/2007 | Machens et al. |
| 2007/0273311 A1 | 11/2007 | Guinet et al. |
| 2008/0010840 A1 | 1/2008 | Lagaly et al. |
| 2008/0189962 A1 | 8/2008 | Reuss et al. |
| 2008/0209742 A1 | 9/2008 | Kretschmar et al. |
| 2009/0000128 A1 | 1/2009 | Kaiser et al. |
| 2009/0077820 A1 | 3/2009 | Gibbons et al. |
| 2010/0000100 A1 | 1/2010 | Saegesser et al. |
| 2010/0031517 A1 | 2/2010 | Fukinuki et al. |
| 2010/0034604 A1 | 2/2010 | Imamura et al. |
| 2010/0175902 A1 | 7/2010 | Rejman et al. |
| 2010/0222713 A1 | 9/2010 | Faller et al. |
| 2010/0224384 A1 | 9/2010 | Gwosdz et al. |
| 2010/0229892 A1 | 9/2010 | Reese et al. |
| 2011/0114347 A1 | 5/2011 | Kasuya et al. |
| 2011/0154921 A1 | 6/2011 | Duan |
| 2011/0162861 A1 | 7/2011 | Borinato et al. |
| 2011/0239473 A1 | 10/2011 | Zurkirchen |
| 2011/0283858 A1 | 11/2011 | Zhou |
| 2011/0296697 A1 | 12/2011 | Kani et al. |
| 2011/0303427 A1 | 12/2011 | Tang |
| 2012/0192440 A1 | 8/2012 | Jerabek et al. |
| 2012/0199372 A1 | 8/2012 | Nishikawa et al. |
| 2012/0247796 A1 | 10/2012 | Mueller et al. |
| 2012/0279736 A1 | 11/2012 | Tanimoto et al. |
| 2013/0062086 A1 | 3/2013 | Ito et al. |
| 2013/0076271 A1 | 3/2013 | Suda et al. |
| 2013/0087355 A1 | 4/2013 | Oomori et al. |
| 2013/0126202 A1 | 5/2013 | Oomori et al. |
| 2013/0145631 A1 | 6/2013 | Ni et al. |
| 2013/0171918 A1 | 7/2013 | Huang |
| 2013/0187587 A1 | 7/2013 | Knight et al. |
| 2013/0189043 A1 | 7/2013 | Uchiuzo et al. |
| 2013/0206437 A1 | 8/2013 | Saitou |
| 2013/0207491 A1 | 8/2013 | Hatfield et al. |
| 2013/0270934 A1 | 10/2013 | Smith et al. |
| 2013/0277081 A1 | 10/2013 | Hayashi et al. |
| 2013/0333910 A1 | 12/2013 | Tanimoto et al. |
| 2013/0342041 A1 | 12/2013 | Ayers et al. |
| 2014/0013917 A1 | 1/2014 | Meier |
| 2014/0062265 A1 | 3/2014 | Zeng et al. |
| 2014/0117892 A1 | 5/2014 | Coates |
| 2014/0216773 A1 | 8/2014 | Steurer |
| 2014/0216777 A1 | 8/2014 | Emch et al. |
| 2014/0245620 A1 | 9/2014 | Fankhauser et al. |
| 2014/0310964 A1 | 10/2014 | Miller et al. |
| 2014/0331506 A1 | 11/2014 | Sugita et al. |
| 2014/0352995 A1 | 12/2014 | Matsunaga et al. |
| 2015/0042247 A1 | 2/2015 | Kusakawa |
| 2015/0135907 A1 | 5/2015 | Hirabayashi et al. |
| 2015/0148806 A1 | 5/2015 | McGinley et al. |
| 2015/0212512 A1 | 7/2015 | Butler |
| 2015/0290790 A1 | 10/2015 | Schomisch et al. |
| 2015/0298308 A1 | 10/2015 | Kato |
| 2016/0008961 A1 | 1/2016 | Takano et al. |
| 2016/0079887 A1 | 3/2016 | Takano et al. |
| 2016/0129578 A1 | 5/2016 | Sprenger et al. |
| 2016/0151845 A1 | 6/2016 | Yamamoto et al. |
| 2016/0193673 A1 | 7/2016 | Yoshida et al. |
| 2016/0218589 A1 | 7/2016 | Purohit et al. |
| 2017/0008159 A1 | 1/2017 | Boeck et al. |
| 2017/0151660 A1 | 6/2017 | Tully |
| 2017/0157760 A1 | 6/2017 | McAuliffe et al. |
| 2017/0222579 A1 | 8/2017 | Wang et al. |
| 2017/0264219 A1 | 9/2017 | Takeda |
| 2017/0338452 A1 | 11/2017 | Varipatis et al. |
| 2017/0338753 A1 | 11/2017 | Forster et al. |
| 2017/0338754 A1 | 11/2017 | Forster et al. |
| 2018/0099394 A1 | 4/2018 | Ichikawa et al. |
| 2018/0316292 A1 | 11/2018 | Wu |
| 2019/0283155 A1* | 9/2019 | Wyler .................. B23D 49/162 |
| 2019/0299307 A1* | 10/2019 | Jensen ................ B23D 49/162 |

FOREIGN PATENT DOCUMENTS

| | | |
|---|---|---|
| CN | 1695857 A | 11/2005 |
| CN | 201244699 Y | 5/2009 |
| CN | 201659555 U | 12/2010 |
| CN | 101989070 A | 3/2011 |
| CN | 202068299 U | 12/2011 |
| CN | 202622753 U | 12/2012 |
| CN | 103567500 A | 2/2014 |
| CN | 103785665 A | 5/2014 |
| CN | 203660853 U | 6/2014 |
| CN | 104065231 A | 9/2014 |
| CN | 203843806 U | 9/2014 |

(56) References Cited

FOREIGN PATENT DOCUMENTS

| | | |
|---|---|---|
| CN | 204103728 U | 1/2015 |
| CN | 104690596 A | 6/2015 |
| CN | 204517624 U | 7/2015 |
| CN | 204585170 U | 8/2015 |
| CN | 204585171 U | 8/2015 |
| CN | 204696893 U | 10/2015 |
| CN | 105215951 A | 1/2016 |
| CN | 205310192 U | 6/2016 |
| CN | 106964843 A | 7/2017 |
| CN | 107570799 A | 1/2018 |
| DE | 3318199 A1 | 11/1984 |
| DE | 2650470 A1 | 5/1987 |
| DE | 3538941 A1 | 5/1987 |
| DE | 3538942 A1 | 5/1987 |
| DE | 8808570 U1 | 9/1988 |
| DE | 3214482 C2 | 10/1988 |
| DE | 19617477 A1 | 11/1997 |
| DE | 202007004931 U1 | 9/2007 |
| DE | 202007010879 U1 | 10/2007 |
| DE | 202008010458 U1 | 11/2008 |
| DE | 102007042185 A1 | 3/2009 |
| DE | 102009032405 A1 | 5/2010 |
| DE | 102010001030 A1 | 7/2011 |
| DE | 102012218275 A1 | 4/2014 |
| DE | 102013202202 A1 | 8/2014 |
| DE | 102016210937 A1 | 12/2017 |
| EP | 0031867 A2 | 7/1981 |
| EP | 0018465 B1 | 4/1984 |
| EP | 0224053 A2 | 6/1987 |
| EP | 0423673 B1 | 12/1994 |
| EP | 0628762 A1 | 12/1994 |
| EP | 0716492 A1 | 6/1996 |
| EP | 0617505 B1 | 11/1996 |
| EP | 1074327 A2 | 2/2001 |
| EP | 1442813 A2 | 8/2004 |
| EP | 3000563 A1 | 3/2016 |
| EP | 3260240 A1 | 12/2017 |
| JP | S63251175 A | 10/1988 |
| JP | S63176075 U | 11/1988 |
| JP | H08141928 A | 6/1996 |
| JP | H08290312 A | 11/1996 |
| JP | H11164579 A | 6/1999 |
| JP | 2004255542 A | 9/2004 |
| JP | 2004322262 A | 11/2004 |
| JP | 4359018 B2 | 11/2009 |
| JP | 2009297807 A | 12/2009 |
| JP | 2010110875 A | 5/2010 |
| JP | 2014233793 A | 12/2014 |
| JP | 2015024486 A | 2/2015 |
| NL | 8803009 A | 7/1990 |
| WO | WO2005102602 A2 | 11/2005 |
| WO | WO2007083447 A1 | 7/2007 |
| WO | WODM073765 | 3/2010 |
| WO | WO2010081771 A1 | 7/2010 |
| WO | WO2011018276 A1 | 2/2011 |
| WO | WO2011047904 A1 | 4/2011 |
| WO | WO2011072436 A1 | 6/2011 |
| WO | WO2011134775 A1 | 11/2011 |
| WO | WO2012135608 A1 | 10/2012 |
| WO | WO2013161118 A1 | 10/2013 |
| WO | WO2014001124 A1 | 1/2014 |

OTHER PUBLICATIONS

Festool USA, "Getting Started: Festool Carvex Jigsaw—Setup and Common Uses." YouTube, published Sep. 17, 2013, https://www.youtube.com/watch?v=6ZPlodgspwc.
International Search Report and Written Opinion for Application No. PCT/US2019/023537, dated Jul. 4, 2019, 12 pages.

* cited by examiner

*FIG. 5* ously conductive material.

JIGSAW

CROSS-REFERENCE TO RELATED APPLICATIONS

This application claims priority to U.S. Provisional Patent Application No. 62/651,776, filed Apr. 3, 2018, the entire contents of which are incorporated herein by reference.

FIELD OF THE INVENTION

The present invention relates to power tools, and more specifically to jigsaws.

BACKGROUND OF THE INVENTION

There are various power tools known in the art that consider ergonomics as a factor in the design process. These power tools can include many benefits for the user due to the increases comfort a user experiences while using these tools.

SUMMARY OF THE INVENTION

The present invention provides, in one aspect, a power tool including a drive system and a housing at least partially supporting the drive system. The housing includes a base configured to support the power tool relative to a workpiece on which the power tool operates. The power tool includes a handle coupled to the housing. The handle defines a longitudinal axis and includes a first portion positioned between the longitudinal axis and the base and a second portion opposite the first portion along the longitudinal axis. The power tool includes an activation switch coupled to a side surface of the housing. The activation switch is slidable in a direction parallel with a switch axis that intersects the longitudinal axis from a deactivated state, in which the drive system is non-operable, to an activated state, in which the drive system is operable. The activation switch is slidable toward the second portion of the handle from an intersection point between the switch axis and the longitudinal axis.

The present invention provides, in another aspect, a power tool including a housing and a handle coupled to the housing. The handle is configured to be gripped by an operator to manipulate the power tool. The power tool also includes a drive system supported in one of the housing or the handle. The drive system includes a frame, a motor at least supported by the frame, and a transmission driven by the motor. The transmission is at least partially supported by the frame. The frame is composed of a non-electrically conductive material.

The present invention provides, in yet another aspect, a power tool including a housing and a handle coupled to the housing. The handle includes a longitudinal axis configured to be oriented parallel to a workpiece in which the power tool is operable to cut. The power tool also includes a drive system supported in one of the housing and the handle. The drive system includes a frame composed of a non-electrically conductive material, a motor at least supported by the frame, and a transmission driven by the motor. The transmission is at least partially supported by the frame. The drive system also includes an output spindle driven by the transmission. The output spindle is configured to reciprocate a cutting blade along a blade axis. The power tool further includes an activation switch coupled to a side surface of the housing. The activation switch is slidable in a direction parallel with a switch axis that intersects the longitudinal axis between a deactivated state, in which the drive system is non-operable, and an activated state, in which the drive system is operable. The switch axis is oriented at an acute angle relative to the longitudinal axis of the handle.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

DETAILED DESCRIPTION

Figure 1:
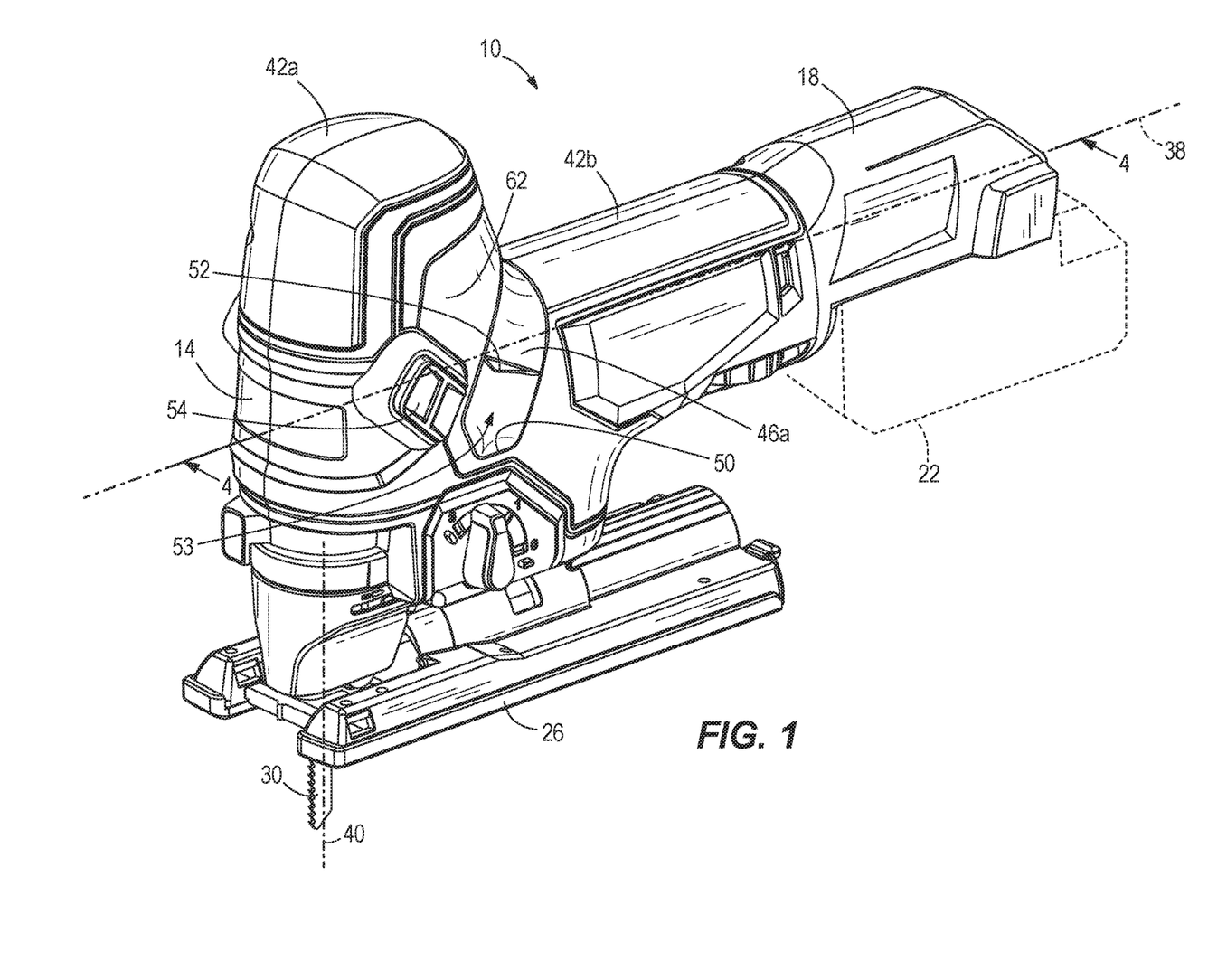
FIG. 1 is a first perspective view of a jigsaw in accordance with an embodiment of the invention.

FIG. 1 illustrates a power tool, such as a jigsaw 10, including a housing 14 having a handle 18, a battery 22 removably coupled to the handle 18 at a rear portion of the housing 14, a guide plate 26 pivotably coupled to the housing 14 and configured to contact a workpiece 28 (FIG. 3) during a cutting operation, and a cutting blade 30 protruding from a front portion of the housing 14 and a lower surface of the guide plate or base 26. The jigsaw 10 includes a drive system 34 (FIG. 4) powered by the battery 22 and operable to impart reciprocating motion to the cutting blade 30 for cutting the workpiece 28. The handle 18 defines a longitudinal axis 38 extending centrally through handle 18 with the longitudinal axis 38 oriented substantially parallel (e.g., within 10 degrees) to the workpiece 28 in which the guide plate 26 abuts. Moreover, the longitudinal axis 38 is substantially perpendicular to a blade axis 40—the blade axis 40 being substantially parallel to a central (vertical) axis of the housing 14—along which the cutting blade 30 generally reciprocates during a cutting operation. The housing 14 includes a first or lower portion 41 (FIG. 3) positioned between the longitudinal axis 38 and the guide plate 26, and a second or upper portion 43 (FIG. 3) positioned opposite the lower portion 41 and extending away from the guide plate 26.

Figures 2, 3:
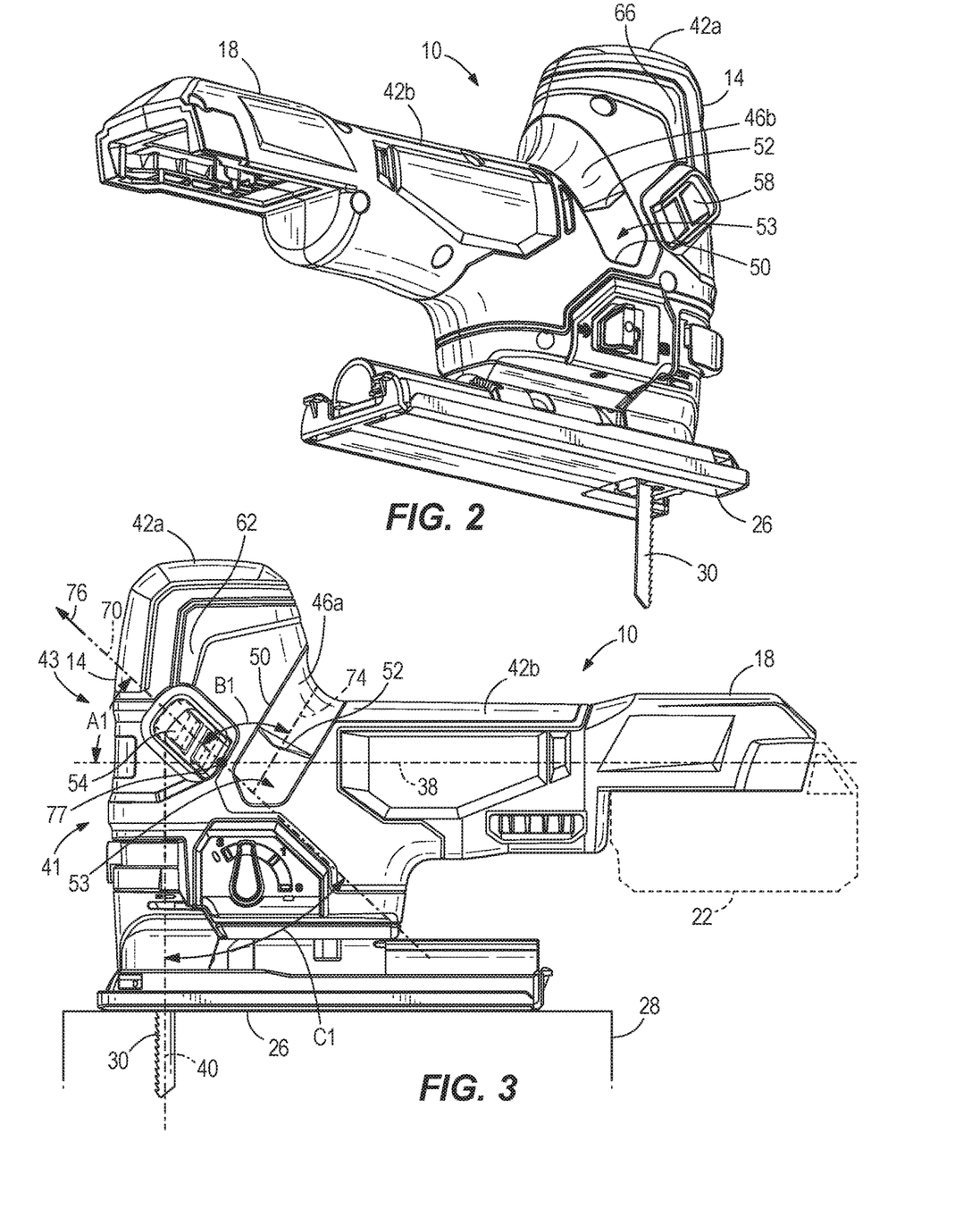
FIG. 2 is a second perspective view of the jigsaw of FIG. 1.
FIG. 3 is a side view of the jigsaw of FIG. 1.

With reference to FIGS. 1-3, the jigsaw 10 also includes gripping surfaces 42a, 42b disposed on the housing 14 and the handle 18, respectively, that are graspable by a user to operate and maneuver the jigsaw 10 relative to the workpiece 28. The gripping surfaces 42a, 42b, in addition to the housing 14 and the handle 18, are composed of a non-conductive material (e.g., plastic with or without an elastomeric overmold). Such a non-conductive material electrically insulates the user in the event that the user inadvertently cuts an electrical wire during a cutting operation, thus inhibiting, or at least mitigating, an electrical shock. The gripping surface 42b on the handle 18 further includes a pair of recessed gripping portions 46a, 46b (FIGS. 1 and 2) disposed on opposite sides of the longitudinal axis 38 and generally located proximate the intersection of the housing 14 and the handle 18. Each recessed gripping portion 46a, 46b is defined by a raised lip 50 that extends substantially around the periphery of the recessed gripping portions 46a, 46b and includes a step 52. The step 52 and the raised lip 50 define an indentation 53 that is formed into at least one of the housing 14 and the handle 18 with the indentations 53 sized to receive a thumb or a finger (e.g., the index finger or the middle finger) of a user to prevent the users' thumb/finger from inadvertently slipping out of the recessed gripping portions 46a, 46b.

With continued reference to FIGS. 1-3, the jigsaw 10 further includes a first activation switch 54 (FIG. 1) and a second activation switch 58 (FIG. 2) in electrical communication with the drive system 34 to selectively supply power to the drive system 34 via the battery 22, discussed in more detail below. The first activation switch 54 is provided on a first lateral side 62 of the housing 14 adjacent the first recessed gripping portion 46a, and the second activation switch 58 is provided on a second lateral side 66—opposite the first lateral side 62—of the housing 14 adjacent the second recessed gripping portion 46b. In other words, the activation switches 54, 58 are located on opposite sides of the longitudinal axis 38. Both switches 54, 58 are slidable parallel to a switch axis 70, which is oriented at an acute angle A1 relative to the longitudinal axis 38 (e.g., the acute angle A1 is located entirely above the longitudinal axis 38; FIG. 3). Specifically, the switch axis 70 intersects the longitudinal axis 38 and at least extends through the housing 14 such that the switch axis 70 is positioned between the first and second activation switches 54, 58. In the illustrated embodiment, the angle A1 of the switch axis 70 is approximately 42 degrees relative to the longitudinal axis 38, as illustrated in FIG. 3. In other embodiments, the angle A1 of the switch axis 70 may be approximately 42 degrees±22.5 degrees relative to the longitudinal axis 38. That is, the angle A1 of the switch axis 70 may range from approximately 19.5 degrees to approximately 64.5 degrees relative to the longitudinal axis 38. In further embodiments, the angle A1 may range from approximately parallel to the longitudinal axis 38 to approximately 60 degrees relative to the longitudinal axis 38.

With reference to FIG. 3, in a side view of the jigsaw 10 as shown in FIG. 3, the switch axis 70 is oriented at an oblique angle B1 relative to a linear central axis 74 that intersects the longitudinal axis 38 with which the recessed gripping portions 46a, 46b are aligned. In the illustrated embodiment the oblique angle B1 is less than 90 degrees (e.g., approximately 65 degrees), however, in other embodiments, the oblique angle B1 can be between about 50 degrees and about 80 degrees.

With reference to the blade axis 40, the switch axis 70 of the illustrated embodiment is oriented at an acute angle C1 that is approximately 48 degrees from the blade axis 40. In other embodiments, the acute angle C1 is between about 25.5 degrees and about 70.5 degrees.

The first and second activation switches 54, 58 are independently slidable between an activated state, in which the battery 22 supplies power to the drive system 34, and a non-activated state (i.e., a deactivated state), in which no power is supplied to the drive system 34. The activated state of the first activation switch 54 is shown in broken lines in FIG. 3 and the non-activated state of the first activation switch 54 is shown in solid lines in FIG. 3. The activated state of the first activation switch 54 is positioned further from the guide plate 26 and the workpiece 28 in an upward direction 76 along the switch axis 70 than the non-activated state. The upward direction 76 moves away from the guide plate 26/workpiece 28 and above the longitudinal axis 38. Stated another way, the first activation switch 54 is slidable in the direction 76 and toward the upper portion 43 of the housing 14 from an intersection point 77 between the switch axis 70 and the longitudinal axis 38. Although only the two states of the first activation switch 54 are shown in FIG. 3, the two states of the second activation switch 58 are arranged in a similar manner. In other embodiments, the activated state and non-activated state of the switches 54, 58 can be switched such that the non-activated state of the activation switches 54, 58 is positioned further from the guide plate 26 in the direction 76 along the switch axis 70 than the activated state. In the illustrated embodiment of the jigsaw 10, the switches 54, 56 are configured as momentary switches that are biased toward the non-activated state, and that return to the non-activated state in response to being released by the user (after having been switched to the activated state). In other embodiments, the switches 54, 56 can be momentary switches that are independently moveable along an axis substantially transverse to the longitudinal axis 38 (e.g., moveable in a direction into the housing 14 in the reference frame of FIG. 3).

Figure 4:
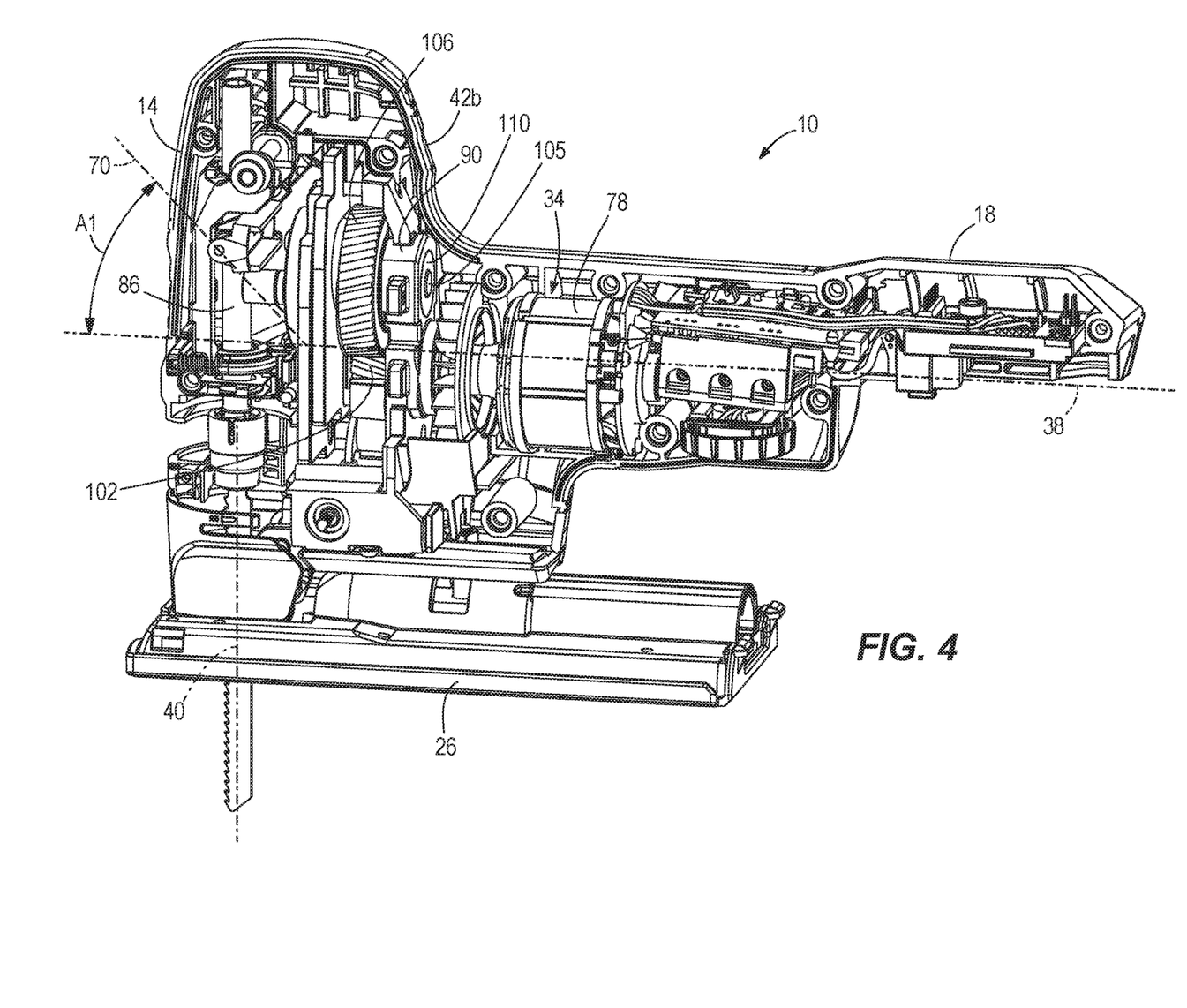
FIG. 4 is a side view of the jigsaw of FIG. 1 with a portion of a housing of the jigsaw removed.
Figure 5:
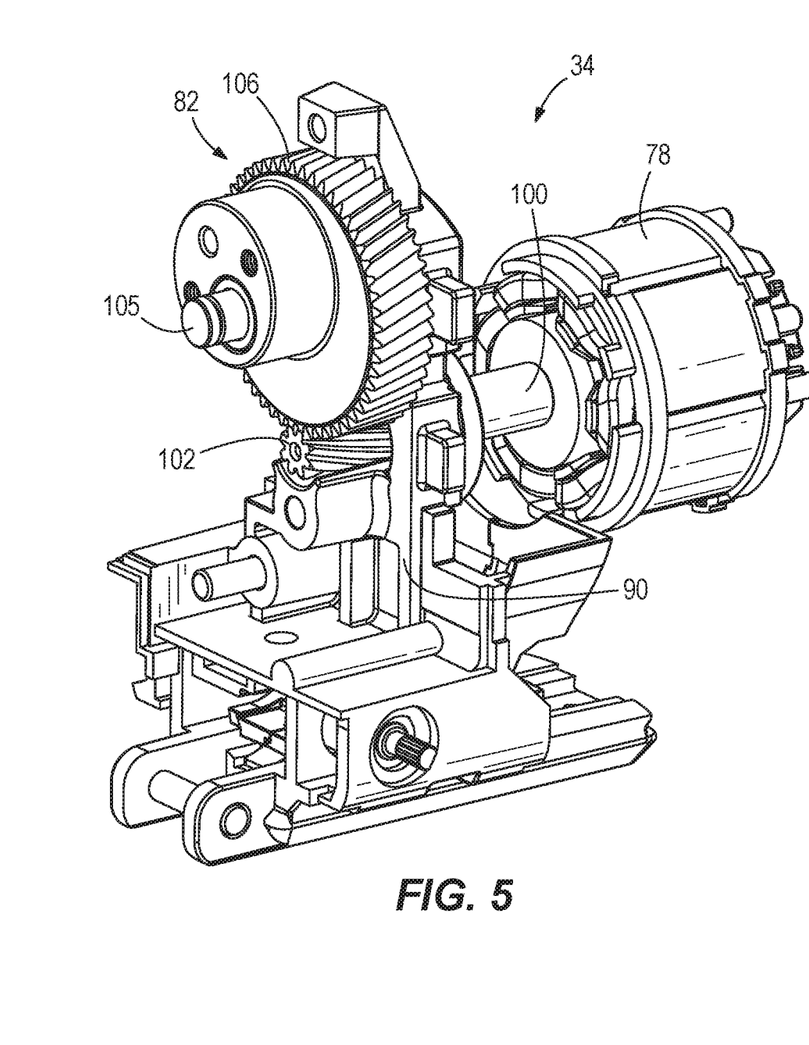
FIG. 5 is a perspective view of a portion of a drive system of the jigsaw, illustrating a motor, a transmission, and a frame supporting the motor and transmission.
Figure 6:
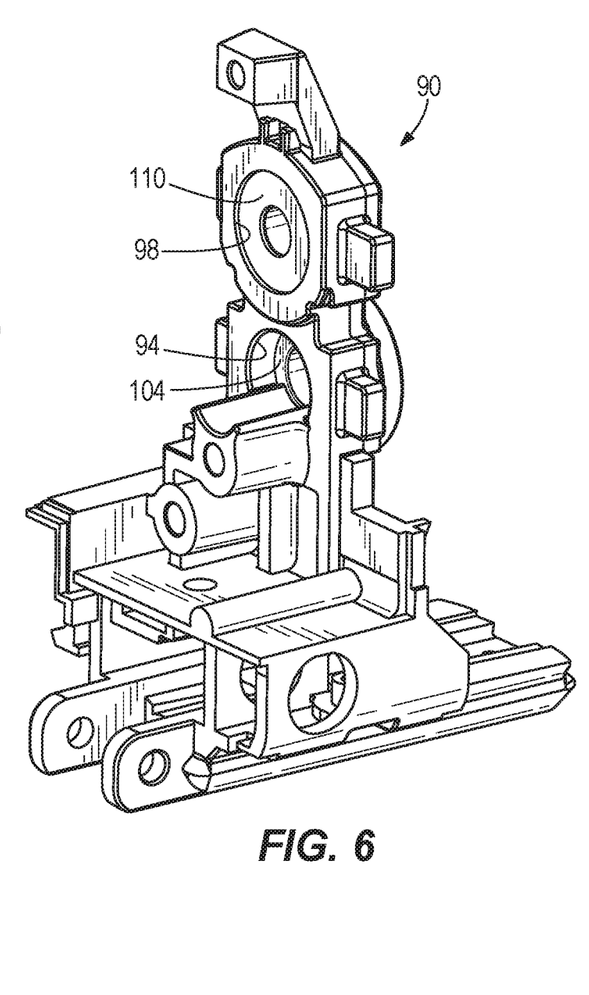
FIG. 6 is a perspective view of the frame of the drive system.

With reference to FIGS. 4-6, the drive system 34 of the jigsaw 10 is disposed within the housing 14 and the handle 18 adjacent the respective gripping surfaces 42a, 42b. The drive system 34 includes a motor 78, a transmission 82 driven by the motor 78 and having an output spindle 86 to which the cutting blade 30 is removably secured, and a frame 90 for mounting the motor 78 and the transmission 82 in the housing 14. The frame 90 is fixedly coupled within the housing 14. Like the gripping surfaces 42a, 42b, the housing 14, and the handle 18, the frame 90 is composed of a non-conductive material (e.g., plastic). Such a non-conductive material electrically insulates the user in the event that the user inadvertently cuts an electrical wire during a cutting operation, thus inhibiting, or at least mitigating, an electrical shock. The frame 90 includes two apertures 94, 98 (FIG. 6) that together support the motor 78 and the transmission 82. The first aperture 94 receives and supports a drive shaft 100 of the motor 78 which, in turn, supports a helical drive gear 102. Specifically, the drive shaft 100—which is parallel to the longitudinal axis 38—is rotatably supported by the frame 90 via a first rotational support member 104 (e.g., a bushing, a radial bearing, etc.). The aperture 98 receives and supports a driven shaft 105 of a helical driven gear 106 of the transmission 82. Specifically, the driven shaft 105—which is parallel to the drive shaft 100—is rotatably supported by the frame 90 via a second rotational support member 110 (e.g., a bushing, a radial bearing, etc.). The helical drive gear 102 intermeshes and drives the helical driven gear 106 of the transmission 82. The transmission 82 transfers the rotational motion of the helical driven gear 106 to a reciprocating motion of the spindle 86 to drive the cutting blade 30 in a reciprocating manner.

During operation, a user may grasp the gripping surfaces 42a, 42b of the housing 14 and the handle 18 to maneuver the jigsaw 10 relative to the workpiece 28. The user may rest the jigsaw 10 on the workpiece 28 via the guide plate 26 and align the cutting blade 30 with the desired cut. The cutting blade 30 reciprocates along the blade axis 40 in response to the user sliding one of the first activation switch 54 or the second activation switch 58 into the activated state and then releasing the switch 54, 58 from the activated state. Specifically, the user either slides the first activation switch 54 parallel to the switch axis 70 from the non-activated state to the activated state (e.g., moves the first activation switch 54 in the direction 76) or slides the second activation switch 58 parallel to the switch axis 70 from the non-activated state to the activated state (e.g., moving the second activation switch 58 in the direction 76), causing the motor 78 to drive the transmission 82 and reciprocate the cutting blade 30. In other words, both activation switches 54, 58 are not positioned in the activated state for the motor 78 and the transmission 82 to drive the cutting blade 30. By holding one activation switch 54, 58 in the activated state for a short period in time (e.g., 2 seconds, 3 seconds, etc.), continuous power from the battery 22 is supplied to the drive system 34 to cut the workpiece 28. Thereafter, the activation switch 54, 58 is released from the activated state to be biased into the non-activated state. Stated another way, power is supplied to the drive system 34 while the switches 54, 58 are in the non-activated state after one of the switches 54, 58 is moved into the activated state. However, to interrupt power being supplied to the drive system 34 to stop movement of the cutting blade 30, one activation switch 54, 58 is simply moved back into the activated state from the non-activated state and released from the activated state (e.g., both switches 54, 58 are then positioned within the non-activated state and the jigsaw 10 is non-operable).

As the activation switches 54, 58 are conveniently located on the side surfaces 62, 66 of the housing 14 adjacent one of the recessed gripping portions 46a, 46b of the gripping surface 42b, the activation switches 54, 58 are easily accessible within an arc path of the user's thumb. As such, a user may simply slide the activation switches 54, 58 without altering or adjusting his or her grip of the jigsaw 10. Moreover, a user is able to use the jigsaw 10 for an extended period of time without experiencing discomfort. This is due, in part, to the non-heat conductive and non-electrically conductive material implemented on the gripping surfaces 42a, 42b, the housing 14, the handle 18, and the frame 90. As a result, the gripping surfaces 42a, 42b are maintained at a moderate temperature without overheating. Also, the user may experience additional comfort due to the ergonomic recessed gripping portion 46a, 46b and the raised lip 50 of the gripping surface 42b, as well as, the orientation of the activation switches 54, 58 (e.g., angles A1, B1).

Various features and advantages of the disclosure are set forth in the following claims.

The invention claimed is:

1. A power tool comprising:
   a drive system;
   a housing at least partially supporting the drive system, the housing including a base configured to support the power tool relative to a workpiece on which the power tool operates;
   a handle coupled to the housing, the handle defining a longitudinal axis, the housing including a first portion positioned between the longitudinal axis and the base, and a second portion opposite the first portion and extending away from the base; and
   an activation switch coupled to a side surface of the housing, the activation switch slidable in a direction parallel with a switch axis that intersects the longitudinal axis from a deactivated state, in which the drive system is non-operable, to an activated state, in which the drive system is operable,
   wherein the activation switch is slidable toward the second portion of the housing from an intersection point between the switch axis and the longitudinal axis when the activation switch moves away from the base in the direction from the deactivated state to the activated state.

2. The power tool of claim 1, wherein the switch axis is oriented at an acute angle relative to the longitudinal axis of the handle, and wherein the acute angle between the switch axis and the longitudinal axis is between 19.5 degrees and 64.5 degrees.

3. The power tool of claim 1, wherein the handle includes a recessed portion positioned adjacent the activation switch, and wherein the recessed portion is configured to receive a portion of an operator's hand to grip the power tool.

4. The power tool of claim 3, wherein the recessed portion is aligned with a central axis that intersects the switch axis at an acute angle relative to the switch axis.

5. The power tool of claim 4, wherein the acute angle between the central axis and the switch axis is between 50 degrees and 80 degrees.

6. The power tool of claim 3, wherein the recessed portion includes a step at least partially defining an indentation, and wherein the indentation is configured to receive a user's thumb or finger to grip the power tool.

7. The power tool of claim 1, wherein the activation switch is a first activation switch, wherein the power tool further comprises a second activation switch coupled to another side surface of the housing, wherein the second activation switch is slidable parallel to the switch axis between a deactivated state, in which the drive system is non-operable, and an activated state, in which the drive system is operable.

8. The power tool of claim 7, wherein the second activation switch moves from the deactivated state to the activated state in the direction parallel with the switch axis.

9. The power tool of claim 8, wherein the first and second activation switches are independently slidable relative to each other.

10. The power tool of claim 9, wherein the drive system is operable while the first activation switch is in the activated state and the second activation switch is in the deactivated state.

11. The power tool of claim 1, wherein the drive system includes a motor and a transmission at least partially supported by a frame, wherein the frame is fixed to one of the housing and the handle, and wherein the frame is composed of a non-electrically conductive material.

12. The power tool of claim 11, wherein the frame is composed of plastic.

13. The power tool of claim 11, wherein the frame includes a first aperture that receives a first rotational support member supporting a drive shaft of the motor, and wherein the frame includes a second aperture that receives a second rotational support member supporting a driven shaft of the transmission.

14. The power tool of claim 13, wherein the first and second rotational support members are bushings.

15. The power tool of claim 11, wherein the handle includes a gripping surface configured to be gripped by the operator to manipulate the power tool, wherein the gripping surface is composed of a non-electrically conductive material having an elastomeric overmold.

16. The power tool of claim 1, wherein the direction is a first direction from the deactivated state to the activated state, and wherein the activation switch is biased in a second direction opposite the first direction.

17. The power tool of claim 1, wherein the drive system includes a motor having a drive shaft, and wherein the longitudinal axis of the handle extends through the drive shaft of the motor.

18. A power tool comprising:
   a housing including a base configured to support the power tool relative to a workpiece on which the power tool operates;
   a handle coupled to the housing, the handle including a longitudinal axis configured to be oriented parallel to the workpiece, the housing including a first portion positioned between the longitudinal axis and the base and a second portion opposite the first portion and extending away from the base;
   a drive system supported in one of the housing and the handle, the drive system including
      a frame composed of a non-electrically conductive material,
      a motor at least supported by the frame,
      a transmission driven by the motor, the transmission at least partially supported by the frame, and
      an output spindle driven by the transmission, the output spindle configured to reciprocate a cutting blade along a blade axis; and
   an activation switch coupled to a side surface of the housing, the activation switch slidable in a direction parallel with a switch axis that intersects the longitudinal axis from a deactivated state, in which the drive system is non-operable, to an activated state, in which the drive system is operable, the switch axis oriented at an acute angle relative to the longitudinal axis of the handle,
   wherein the activation switch is slidable toward the second portion of the housing from an intersection point between the switch axis and the longitudinal axis when the activation switch moves away from the base in the direction from the deactivated state to the activated state.

19. The power tool of claim 18, wherein the acute angle is between 19.5 degrees and 64.5 degrees.

20. The power tool of claim 18, wherein the frame is composed of plastic.

* * * * *